United States Patent [19]

Sommer et al.

[11] 4,022,763
[45] May 10, 1977

[54] SULFAPHENYL-AZO-PHENYL-AZO-AMINOPHENYL DYESTUFFS

[75] Inventors: Richard Sommer, Leverkusen; Gerhard Wolfrum, Opladen; Edgar Siegel, Leverkusen, all of Germany

[73] Assignee: Bayer Aktiengesellschaft, Leverkusen, Germany

[22] Filed: Feb. 11, 1971

[21] Appl. No.: 114,686

[30] Foreign Application Priority Data

Feb. 14, 1970 Germany .................... 2006733
Oct. 10, 1970 Germany .................... 2049810

[52] U.S. Cl. ............................. 260/186; 260/165; 260/174; 260/178; 260/184; 260/187; 260/206; 260/207

[51] Int. Cl.² ................ C09B 31/04; C09B 31/08; C09B 31/14; D06P 3/24

[58] Field of Search .......... 260/165, 178, 184, 186, 260/187

[56] References Cited

UNITED STATES PATENTS

| | | | |
|---|---|---|---|
| 1,835,393 | 12/1931 | Hentrich et al. | 260/165 |
| 3,070,592 | 12/1962 | Baumann et al. | 260/165 |
| 3,479,332 | 11/1969 | Jirou et al. | 260/186 |
| 3,485,814 | 12/1969 | Speck | 260/186 |
| 3,557,080 | 1/1971 | Dehnert et al. | 260/165 |

FOREIGN PATENTS OR APPLICATIONS 952,061  3/1964  United Kingdom .............. 260/186

*Primary Examiner*—Floyd D. Higel
*Attorney, Agent, or Firm*—Plumley and Tyner

[57] ABSTRACT

Disazo dyestuff which in the form of the free acid correspond to the formula

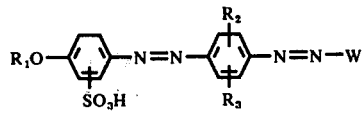

in which W stands for the radical

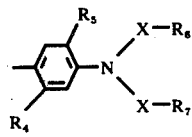

or the radical

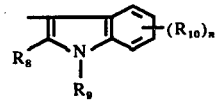

$R_1$ stands for hydrogen, an alkyl radical or a phenyl group; $R_2$ and $R_3$, independently of one another, stand for hydrogen, halogen, an alkyl group, an alkoxy group or an acylamino group; $R_4$ stands for hydrogen, halogen, an alkyl group, an alkoxy group or an acylamino group; $R_5$ stands for hydrogen, an alkyl group or an alkoxy group; $R_6$ and $R_7$, independently of one another, stand for hydrogen, hydroxy, cyano, halogen, acyloxy, alkoxycarbonyl or phenyl; X stands for an alkylene radical with 1 – 4 carbon atoms; $R_8$ stands for an alkyl, phenyl, 2-naphthyl or 4-biphenyl group which is not further substituted; $R_9$ stands for hydrogen or an alkyl group with 1 – 6 carbon atoms which may be substituted by a nitrile, carboxamide or carboxyl group; $R_{10}$ stands for a substituent; and $n$ stands for the numbers 0 – 2.

This dyestuff is suitable for dyeing synthetic fibers, especially polyamide fibers, with very good fastness to light.

5 Claims, No Drawings

SULFAPHENYL-AZO-PHENYL-AZO-AMINOPHENYL DYESTUFFS

The subject-matter of the present invention comprises new valuable disazo dyestuffs which in the form of the free acid correspond to the general formula $$R_1O-\underset{SO_3H}{\underset{|}{C_6H_3}}-N=N-\underset{R_3}{\underset{|}{C_6H_3}}-N=N-W \quad (I)$$

as well as their production and their use for the dyeing of synthetic fibre materials, especially those of polyamides.

In the general formula (I)

W stands for a radical $$\underset{R_4}{\underset{|}{C_6H_2}}\underset{R_5}{\overset{|}{-}}-N\underset{X-R_7}{\overset{X-R_6}{<}} \quad (Ia)$$

or a radical (IIa) — indole ring with $R_8$, $R_9$ on N, and $(R_{10})_n$

In the radicals (Ia) and (IIa)

$R_1$ stands for hydrogen, an alkyl radical or a phenyl group;

$R_2$ and $R_3$, independently of one another, stand for hydrogen, halogen, an alkyl group, an alkoxy group or an acylamino group;

$R_4$ means hydrogen, halogen, an alkyl group, an alkoxy group or an acylamino group;

$R_5$ stands for hydrogen, an alkyl group or an alkoxy group;

$R_6$ and $R_7$, independently of one another, stand for hydrogen, hydroxy, cyano, halogen, acyloxy, alkoxy-carbonyl or phenyl;

X means an alkylene radical with 1 – 4 carbon atoms;

$R_8$ means an alkyl, phenyl, 2-naphthyl or 4-biphenylyl group which is not further substituted;

$R_9$ means hydrogen or an alkyl group with 1 – 6 carbon atoms which may be substituted by a nitrile, carboxamide or carboxyl group;

$R_{10}$ stands for a substituent; and $n$ stands for the numbers 0 – 2.

The alkyl and alkoxy radicals as well as the phenyl radicals may be further substituted, unless otherwise stated.

Preferred alkyl and alkoxy radicals $R_1 - R_5$ are those with 1 – 4 carbon atoms.

The following radicals may be mentioned by way of example: $-CH_3$, $-C_2H_5$, $-C_3H_7$, $-C_4H_9$, $-OCH_3$, $-OC_2H_5$, $-OC_4H_9$.

Suitable halogen atoms are primarily Cl and Br.

Suitable phenyl radicals are primarily phenyl, chlorophenyl, nitrophenyl, $C_1-C_4$-alkoxyphenyl.

The acylamino groups primarily comprise formylamino, alkyl-carbonylamino, phenyl-carbonylamino, alkyl-sulphonylamino and phenyl-sulphonylamino groups; the alkyl and phenyl radicals may be further substituted.

Suitable acylamino groups are, for example, formylamino, acetylamino, propionylamino, butyrylamino, methylsulphonylamino, phenylsulphonylamino, hydroxyacetylamino, phenoxyacetylamino, p-chlorobenzoylamino, benzoylamino, 2,5-dichlorobenzoylamino, phenylacetylamino radicals.

The acyloxy groups primarily comprise alkyl-carbonyloxy groups with 1 – 4 carbon atoms in the alkyl group and alkoxy-carbonyloxy groups with 1 – 4 carbon atoms in the alkoxy group.

Suitable alkoxy-carbonyloxy groups are primarily those with 1 – 4 carbon atoms in the alkoxy group.

Suitable alkylene radicals X are, for example, $-CH_2-$, $-CH_2CH_2-$, $$-CH_2-, -CH_2CH_2-, -\underset{CH_3}{\underset{|}{CH}}-CH_2-, -CH_2CH_2CH_2-,$$

$$-\underset{CH_3}{\underset{|}{CH}}-CH_2CH_2-, -CH_2-\underset{CH_3}{\underset{|}{CH}}-CH_2-, -CH_2-CH_2-\underset{CH_3}{\underset{|}{CH}}-,$$

$$-CH_2-CH_2-CH_2-CH_2-.$$

$-CH_2-CH_2-CH_2-CH_2-$.

Suitable radicals $-X-R_6$ or $-X-R_7$ are, for example, $-CH_3$, $-C_2H_5$, $-C_4H_9$, $-CH_2CH_2CN$, $-CH_2CH_2OH$, $-CH_2CH_2OCOCH_3$, $-CH_2CH_2OCOC_2H_5$, $-CH_2CH_2OCOC_3H_7$, $-CH_2CH_2OCOOCH_3$, $-CH_2CH_2OCOOC_2H_5$, $-CH_2CH_2OCOOC_4H_9$, $-CH_2-C_6H_5$, $-CH_2CH_2Cl$, $-CH_2CH_2COOCH_3$, $-CH_2CH_2COOC_2H_5$.

Preferred dyestuffs are those of the general formula $$R_1O-\underset{SO_3H}{\underset{|}{C_6H_3}}-N=N-\underset{R_3}{\underset{|}{C_6H_3}}-N=\underset{R_4}{\underset{|}{C_6H_2}}\underset{R_5}{\overset{|}{-}}=N-N\underset{X-R_7}{\overset{X-R_6}{<}} \quad (II)$$

in which $R_1 - R_7$ and X have the same meaning as in formula (I), and, more particularly, those of the formula $$R_1'O-\underset{SO_3H}{\underset{|}{C_6H_3}}-N=N-\underset{R_3'}{\underset{|}{C_6H_3}}-N= \quad (III)$$

-continued

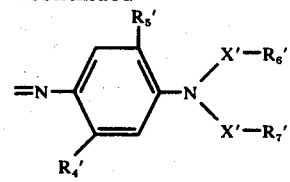

in which
- $R_1'$ stands for alkyl with 1 – 4 carbon atoms;
- $R_2'$ means hydrogen or alkoxy with 1 – 4 carbon atoms;
- $R_3'$ stands for hydrogen or alkyl with 1 – 4 carbon atoms;
- $R_4'$ means hydrogen, alkyl with 1 – 4 carbon atoms, Cl, Br or an alkyl-carbonylamino group with 1 – 4 carbon atoms;
- $R_5'$ means hydrogen or alkoxy with 1 – 4 carbon atoms;
- X means $-CH_2CH_2-$ or $-CH_2-$; and
- $R_6'$ and $R_7'$ independently of one another, stand for hydrogen, Cl, OH, CN, alkyl-carbonyloxy with 1 – 4 carbon atoms in the alkyl group, or alkoxy-carbonyl with 1 – 4 carbon atoms in the alkoxy group.

Other preferred dyestuffs are those of the general formula

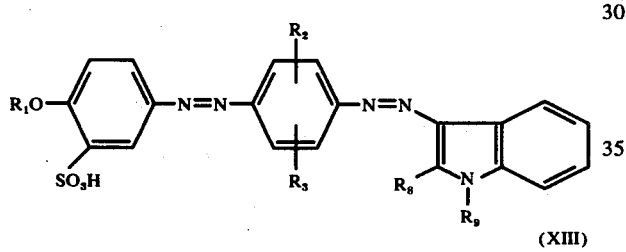

in which $R_1 - R_3$ as well as $R_8$ and $R_9$ have the same meaning as in formula (I),
and, more particularly, those of the formula

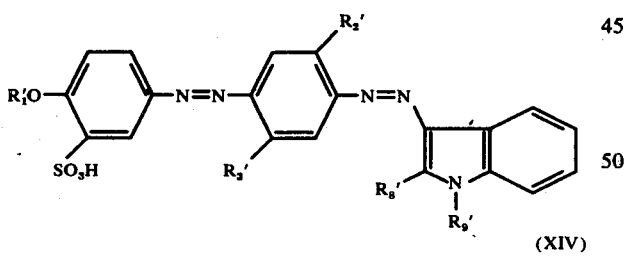

in which
- $R_1'$ stands for alkyl with 1 – 4 carbon atoms;
- $R_2'$ means hydrogen or alkoxy with 1 – 4 carbon atoms;
- $R_3'$ stands for hydrogen or alkyl with 1 – 4 carbon atoms;
- $R_8'$ stands for alkyl with 1 – 4 carbon atoms or for phenyl;
- $R_9'$ means hydrogen or an alkyl group with 1 – 4 carbon atoms which may be substituted by a nitrile, carboxamide or carboxyl group.

The new dyestuffs are obtained by diazotising aniline-sulphonic acids of the formula

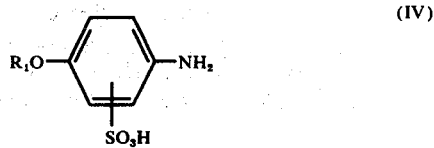

in which $R_1$ has the same meaning as in formula (I); combining the product with coupling components of the general formula

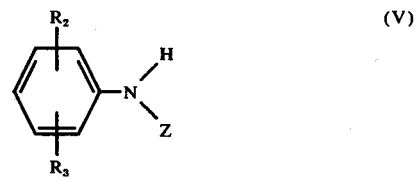

in which $R_2$ and $R_3$ have the same meaning as in formula (I) and Z stands for H or for the radical of a group which can be split off and facilitates the coupling, for example, a sulphoalkylene group or a sulphonic acid group;

further diazotising the resultant monoazo dyestuffs of the formula

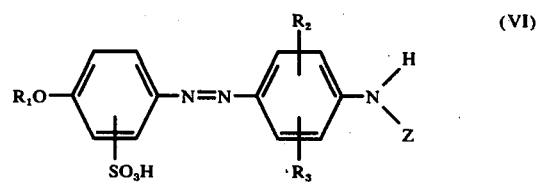

and coupling with an amine of the formula

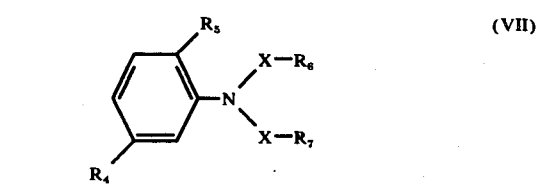

or an indole of the formula

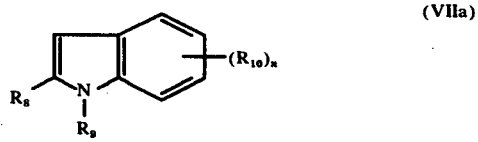

in which $R_4 - R_{10}$, n and X have the same meaning as in formula (I).

In the case where Z is different from H, the group $-NHZ$ is converted into a group $NH_2$ prior to diazotisation.

The dyestuffs according to the invention can also be synthetised by diazotising a middle component

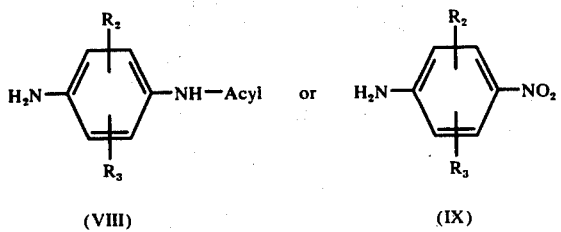

(VIII) or (IX)

in which $R_2$ and $R_3$ have the same meaning as above and acyl represents an acyl radical, for example, an acetyl, oxalyl or benzoyl radical;
coupling in an alkaline medium with phenol-2- or -3-sulphonic acid to form dyestuffs of the formula

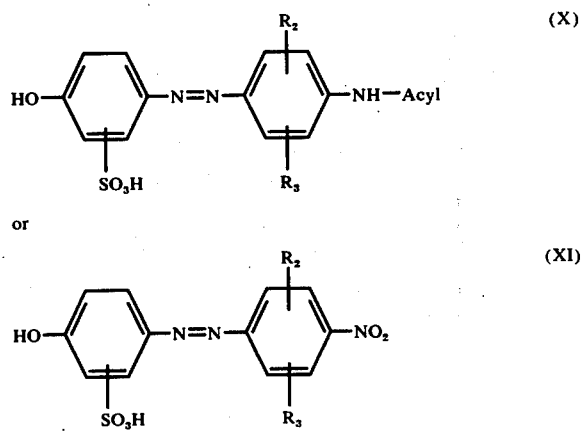

(X)

or (XI)

subsequently alkylating the hydroxyl group, if desired; eliminating the acyl radical from the dyestuffs (X) or reducing the nitro group in the dyestuffs (XI) to the amino group; subsequently diazotising the aminoazo dyestuff of the formula

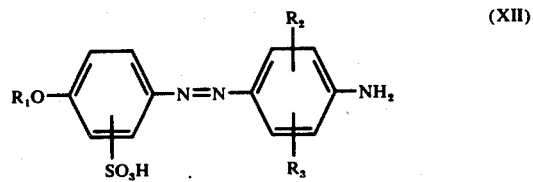

(XII)

and coupling, as described above, with amines of the formula (VII) or with indoles of the formula (VIIa).

Suitable aniline-sulphonic acids (IV) are, for example; 4-methoxy-aniline-sulphonic acid-(3), 4-methoxy-aniline-sulphonic acid-(2), 4-ethoxy-aniline-sulphonic acid-(3), 4-ethoxy-aniline-sulphonic acid-(2), 4-propoxy-aniline-sulphonic acid-(3), 4-isopropoxy-aniline-sulphonic acid-(2), 4-butoxy-aniline-sulphonic acid-(3), 4-isobutoxy-aniline-sulphonic acid-(2), 4-tert.-butoxyaniline-sulphonic acid-(3), 4-hydroxy-aniline-sulphonic acid-(3), 4-phenoxy-aniline-sulphonic acid-(3).

Suitable coupling components of the general formula (V) are, for example:
aniline-ω-methane-sulphonic acid or aniline-sulphamic acid, 2-aminotoluene, 3-aminotoluene, 2-amino-ethylbenzene, 3-aminoethylbenzene, 3-chloroaniline, 3-bromoaniline, 2-amino-anisole, 3-amino-anisole, 2-amino-ethoxybenzene, 3-amino-ethoxybenzene, 1-amino-anisole, 2-amino-ethoxybenzene, 3-amino-ethoxybenzene, 1-amino-2,5-dimethyl-benzene, 1-amino-2,3-dimethyl-benzene, 1-amino-3,5-dimethylbenzene, 3-amino-4-methoxy-toluene, 2-amino-4-methoxy-toluene, 2-amino-1,4-dimethoxy-benzene, 2-amino-4-ethoxy-toluene, 2-amino-1,4-diethoxybenzene, 3-acetylamino-aniline, 3-propionylamino-aniline.

Suitable coupling components of the general formula (VII) or (VIIa) are, for example:
N,N-dimethylaniline, N,N-diethylaniline, N-methyl-N-n-butyl-aniline, N,N-diethyl-m-toluidine, N,N-diethylamino-3-chlorobenzene, N,N-diethyl-N'-formyl-m-phenylene-diamine, N,N-diethyl-N'-acetyl-m-phenylene-diamine, N,N-diethyl-N'-propionyl-m-phenylenediamine, N,N-diethylamino-3-methoxybenzene, 1-N,N-diethylamino-2,5-dimethoxybenzene, 1-N,N-diethylamino-2,5-diethoxybenzene, 1-N,N-diethylamino-2-methoxy-3-acetylaminobenzene, N-ethyl-N-β-chloroethyl-aniline, N,N-bis-(β-chloro-ethyl)-aniline, N-(β-chloroethyl)-N-butyl-aniline, N-(β-chloroethyl)-N-ethyl-m-toluidine, N,N-bis-(β-chloroethyl)-m-toluidine, N-methyl-N-β-hydroxyethyl-aniline, N-ethyl-N-β-hydroxyethylaniline, N,N-bis-(β-hydroxyethyl)-aniline, N-butyl-N-(β-hydroxyethyl)-aniline, N,N-bis-(β-hydroxyethyl)-aniline, N-butyl-N-(β-hydroxyethyl)-aniline, N,N-bis-(β,γ-dihydroxypropyl)-aniline, N-ethyl-N-benzyl-aniline, N-ethyl-N-benzyl-m-toluidine, N-ethyl-N-β-hydroxyethyl-m-toluidine, N,N-bis-(β-hydroxyethyl)-m-toluidine, 1-(N-ethyl-N-β-hydroxyethyl)-amino-2-methoxy-5-methylbenzene, N-ethyl-N-β-hydroxyethyl-N'-acetyl-m-phenylenediamine, N,N-bis-(β-hydroxyethyl)-N'-acetyl-m-phenylene-diamine, 1-N,N-bis-(β-hydroxyethyl)-amino-2-methoxy-5-acetylaminobenzene, 1-N,N-bis-(β-hydroxyethyl)-amino-2-ethoxy-5-acetylamino-benzene, 1-N,N-bis-(β-hydroxyethyl)-amino-2-methoxy-5-propionylamino-benzene, N-ethyl-N-β-acetoxyethylaniline, N,N'bis-(β-acetoxyethyl)-aniline, N-butyl-N-β-acetoxyethyl-aniline, N-ethyl-N-β-acetoxyethyl-m-toluidine, N,N-bis-(β-acetoxyethyl)-m-toluidine, 1-(N-ethyl-N-β-acetoxyethyl)-amino-2-methoxy-5-methylbenzene, N-ethyl-N-β-acetoxyethyl-N'-acetyl-m-phenylenediamine, N,N-bis-(β-acetoxyethyl)-N'-acetyl-m-phenylene-diamine, 1-N,N-bis-(β-acetoxyethyl)-amino-2-methoxy-5-acetylamino-benzene, 1-N,N-bis-(β-acetoxyethyl)-amino-2-ethoxy-5-acetylamino-benzene, 1-N,N-(β-acetoxyethyl)-amino-2-methoxy-5-propionylamino-benzene, N,N-bis-(β-ethoxy-carbonyloxy-ethyl)-aniline, N,N-bis-(β-methoxycarbonyloxy-ethyl)-aniline, N,N-bis-(β-ethoxy-carbonyloxyethyl)-m-toluidine, N,N-bis-(β-methoxy-carbonyloxy-ethyl)-m-toluidine, N,N-bis-(β-ethoxy-carbonyloxy-ethyl)-N'-acetyl-m-phenylene-diamine, N,N-bis-(β-methoxy-carbonyloxy-ethyl)-N' acetyl-m-phenylene-diamine, 1-N,N-bis-(β-ethoxy-carbonyloxy-ethyl)-amino-2-methoxy-5-acetylaminobenzene, 1-N,N-bis-(β-methoxy-carbonyloxy-ethyl)-amino-2-methoxy-5-acetylaminobenzene, 1-N,N-bis-(β-ethoxy-carbonyloxy-ethyl)-amino-2-ethoxy-5-acetylaminobenzene, 1-N,N-bis-(β-methoxy-carbonyloxy-ethyl)-amino-2-ethoxy-5-acetylaminobenzene, N,N-bis-(β-carbomethoxyethyl)-N'-acetyl-m-phenylene-diamine, N-methyl-N-β-cyanoethylaniline, N,N-bis-(β-cyanoethyl)-aniline, N-ethyl-N-β-cyanoethylaniline, N,N-bis-(β-cyanoethyl)-aniline, N-ethyl-N-β-cyanoethyl-m-toluidine, N-ethyl-N-β-cyanoethyl-N'-acetylamino-m-phenylenediamine, N-β-hydroxyethyl-N-β-cyanoethyl-aniline, N-β-acetoxyethyl-N-β-cyanoethyl-m-toluidine, N-β-methoxy-carbonyloxyethyl-N-β-cyanoethyl-N'-acetylamino-m-phenylene-diamine, N,N-bis-(β-cyanoethyl)-N'-benzoyl-m-phenylene-diamine, N-β-hydroxyethyl-N-β-cyanoethyl-N'-phenacetyl-m-phenylene-diamine, N,N-diethyl-N'-phenoxyacetyl-m-phenylene-diamine, N-ethyl-N-β-cyanoethyl-N'-phenoxyacetyl-m-phenylene-diamine, N,N-bis(β-cyanoethyl)-N'-p-chlorobenzoyl-m-phenylene-diamine, 2-methylindole, 2-phenylindole, 1-methyl-2-phenylindole, 1,2-dimethylindole, 1-β-cyanoethyl-2-methylindole, 1-β-cyanoethyl-2-phenylindole, γ-(2-phenylindolyl-1)-propionic acid amide, γ-(2-methylindolyl-1)-propionic acid amide, γ-(2-methylindolyl-1)-propionic acid, 2-β-naphthyl-indole, 2-p-biphenylylindole, 2,5-dimethylindole, 2,4-dimethyl-7-methoxyindole, 2-phenyl-5-ethoxyindole, 2-methyl-5-ethoxyindole, 2-methyl-5-chloroindole, 2-methyl-5-nitroindole, 2-methyl-5-cyanoindole, 2-methyl-7-chloroindole, 2-methyl-5-fluoroindole, 2-methyl-5-bromoindole, 2-methyl-5,7-dichloroindole and 1-cyanoethyl-2,6-dimethylindole.

The diazo components of the formula (IV) are diazotised in known manner, for example, in an acidic aqueous solution with a sodium nitrite solution at 0° 14 20° C and the diazo compound is combined with the coupling components of the formulae (V). Coupling can be carried out in a neutral to strongly acidic, but preferably in a weakly acidic or organicaqueous medium.

Further diazotisation of the aminoazo dyestuffs (VI) or (XII) can be carried out, for example, in an acidic aqueous dispersion with a sodium nitrite solution; the diazotisation temperatures may lie between 0° and 30° C. Furthermore, aminoazo dyestuffs of the formula (XII) can also be indirectly diazotised by dissolving them in an alkaline medium, adding a sodium nitrite solution, and pouring the mixture into aqueous hydrochloric acid or adding hydrochloric acid to the mixture.

Coupling of the diazotised aminoazo dyestuffs (VI) or (XII) with amines (VII) or indoles (VIIa) to form the disazo dyestuffs (I) is likewise carried out in known manner, for example in a neutral or a weakly or strongly acidic aqueous medium or also in an aqueous-organic medium. In general, the disazo dyestuffs of the formula (I) are rather sparingly soluble in an acidic medium and can be isolated by simple filtering off, possibly after the addition of 2 – 10% sodium chloride. If the dyestuffs are obtained in an impure state, they can be reprecipitated in known manner from hot water, optionally with the addition of alkali. The more sparingly soluble acidically isolated dyestuffs of the formula (I) can be rendered readily water-soluble by mixing them with salts from strong bases and weak acids, for example, trisodium phosphate, disodium hydrogen phosphate, sodium tetraborate, sodium metaphosphate, sodium metasilicate or sodium carbonate.

The dyestuffs according to the invention are suitable for the dyeing of snythetic fibre materials, especially for the dyeing of polyamide fibres, in level, productive, yellowish red, red and bluish red shades of very good fastness to light. They draw well on polyamide fibres even from a neutral to weakly acidic bath. The polyamide fibres primarily comprise those of synthetic polyamides such as ε-caprolactam or condensation products of adipic acid and hexamethylene-diamine.

EXAMPLE 1

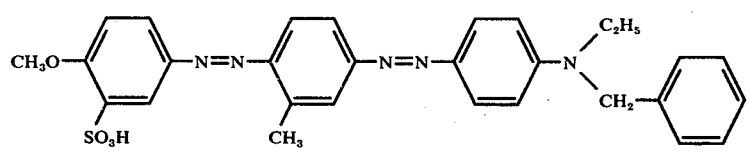

20.3 g (0.1 mol) 4-amino-anisole-sulphonic acid-(2) are dissolved in 200 ml of water with a sodium hydroxide solution at pH 7, 6.9 g sodium nitrite are added, the mixture is cooled with ice, and 28 ml of concentrated hydrochloric acid are added at 0 – 5° C. After 30 minutes, diazotisation has ended. A solution of 10.7 g (0.1 mol) 3-aminotoluene in 100 ml of water and 5 ml of concentrated hydrochloric acid is then added to the diazo suspension. The mixture is then slowly neutralised at 0°– 10° C with a concentrated sodium hydroxide solution until the pH value is 6. The dyestuff is salted out with 10% sodium chloride and filtered off with suction.

The aminoazo dyestuff so obtained is dissolved in 300 ml of water at pH 7. 6.9 g sodium nitrite are then added, the mixture is cooled, and 28 ml of concentrated hydrochloric acid are added at 0°– 5° C. After diazotising for one hour, the diazo suspension is poured into a solution of 21.1 g (0.1 mol) N-phenyl-N-ethylbenzylamine in 500 ml of water and 40 ml of concentrated hydrochloric acid. The pH value is then slowly adjusted to pH 4 – 5 with sodium acetate or solution of sodium hydroxide. After coupling, the dyestuff is isolated in the usual way and dried at 90° C. The dyestuff dyes polyamide from a weakly acidic or neutral bath in yellowish scarlet shades of good fastness to light.

Valuable water-soluble disazo dyestuffs which dye polyamide in yellowish red to bluish red shades fast to light are also obtained when the procedure described above is followed, but with the use of the compounds given in Column I as diazo component, those of Column II as middle component and those of Column III as final component.

| No. | I | II | III | Shade on polyamide |
|---|---|---|---|---|
| 2 | CH₃O—⟨⟩—NH₂, SO₃H | ⟨⟩—NH₂, CH₃ | ⟨⟩—N(C₂H₅)(CH₂-⟨⟩), CH₃ | yellowish red |

-continued

| No. | I | II | III | Shade on polyamide |
|---|---|---|---|---|
| 3 | " | " | ![3-methyl-N,N-diethylaniline] | bluish red |
| 4 | " | " | ![N,N-diethylaniline] | yellowish red |
| 5 | " | " | ![3-methyl-N-(2-cyanoethyl)-N-(2-acetoxyethyl)aniline] | scarlet |
| 6 | " | " | ![3-acetamido-N,N-bis(2-methoxycarbonylethyl)aniline] NH—COCH$_3$ | bluish red |
| 7 | " | " | ![3-acetamido-N-ethyl-N-(2-hydroxyethyl)aniline] NHCOCH$_3$ | bluish red |
| 8 | " | " | ![3-methyl-N,N-bis(2-cyanoethyl)aniline] | red |
| 9 | " | " | ![N,N-bis(2-methoxycarbonyloxyethyl)aniline] | yellowish red |
| 10 | " | " | ![3-chloro-N,N-bis(2-methoxycarbonyloxyethyl)aniline] Cl | red |
| 11 | " | " | ![2-methoxy-4-acetamido-N,N-bis(2-methoxycarbonyloxyethyl)aniline] OCH$_3$ NHCOCH$_3$ | ruby |
| 12 | " | " | ![2-methoxy-5-methyl-N,N-bis(2-methoxycarbonyloxyethyl)aniline] OCH$_3$ CH$_3$ | bluish red |
| 13 | " | ![aniline]—NH$_2$ | ![3-methyl-N-ethyl-N-benzylaniline] CH$_3$ | bluish scarlet |
| 14 | " | " | ![3-methyl-N,N-diethylaniline] CH$_3$ | red |
| 15 | " | " | ![N-ethyl-N-benzylaniline] | yellowish scarlet |
| 16 | " | " | ![3-(methoxycarbonylamino)-N,N-bis(2-cyanoethyl)aniline] CH$_3$OCNH | red |
| 17 | " | " | ![2-methoxy-4-acetamido-N,N-bis(2-methoxycarbonyloxyethyl)aniline] OCH$_3$ NHCOCH$_3$ | bluish red |
| 18 | " | " | ![N,N-diethylaniline] | yellowish red |

-continued

| No. | I | II | III | Shade on polyamide |
|---|---|---|---|---|
| 19 | " | 2-OCH$_3$, aniline (NH$_2$, OCH$_3$) | phenyl-N(CH$_2$CH$_2$OCOOCH$_3$)$_2$ | red |
| 20 | " | 2-CH$_3$ aniline | phenyl-N(CH$_3$)(CH$_2$CH$_2$CN) | yellowish red |
| 21 | " | 3-Cl aniline | 2,5-di-CH$_3$ phenyl-N(CH$_2$CH$_2$OCOC$_2$H$_5$)$_2$ | bluish red |
| 22 | " | 2-OCH$_3$-4-CH$_3$ aniline | 3-CH$_3$ phenyl-N(CH$_2$CH$_2$OCOOCH$_3$)$_2$ | bluish red |
| 23 | C$_2$H$_5$O-, SO$_3$H, NH$_2$ (ethoxy aminobenzenesulfonic acid) | 3-CH$_3$ aniline | 3-CH$_3$ phenyl-N(C$_2$H$_5$)$_2$ | red |
| 24 | " | " | phenyl-N(C$_2$H$_5$)(CH$_2$-phenyl) | yellowish scarlet |
| 25 | " | " | 3-CH$_3$ phenyl-N(C$_2$H$_5$)(CH$_2$-phenyl) | scarlet |
| 26 | " | " | 3-CH$_3$ phenyl-N(CH$_2$CH$_2$CN) | red |
| 27 | " | " | 3-Cl phenyl-N(CH$_2$CH$_2$OCOCH$_3$)$_2$ | red |
| 28 | " | aniline | phenyl-N(C$_2$H$_5$)(CH$_2$-phenyl) | yellowish scarlet |
| 29 | " | " | phenyl-N(C$_2$H$_5$)$_2$ | bluish scarlet |
| 30 | " | " | 3-CH$_3$ phenyl-N(C$_2$H$_5$)(CH$_2$-phenyl) | yellowish red |
| 31 | " | " | 3-Cl phenyl-N(C$_2$H$_5$)$_2$ | red |
| 32 | " | " | 3-OCH$_3$ phenyl-N(CH$_2$CH$_2$CN)$_2$ | bluish red |
| 33 | " | " | phenyl-N(CH$_2$CH$_2$CH$_2$CH$_3$)(CH$_2$CH$_2$Cl) | yellowish red |
| 34 | " | " | phenyl-N(CH$_2$CH$_2$OCOOCH$_3$)$_2$ | yellowish red |

-continued

| No. | I | II | III | Shade on polyamide |
|---|---|---|---|---|
| 35 | " | " | 3-OCH₃-phenyl-N(CH₂CH₂CN)₂ | bluish red |
| 36 | " | " | 3-CH₃-phenyl-N(CH₂CH₂Cl)(C₂H₅) | red |
| 37 | " | phenyl-NH₂ | 3-Br-phenyl-N(C₂H₅)₂ | red |
| 38 | " | 2-OCH₃-phenyl-NH₂ | phenyl-N(CH₂CH₂OCOOCH₃)₂ | yellowish red |
| 39 | " | 2-OCH₃-5-CH₃-phenyl-NH₂ | 3-CH₃-phenyl-N(CH₂CH₂OCOOCH₃)₂ | bluish red |
| 40 | " | " | 3-NHCOCH₃-phenyl-N(CH₂CH₂OCOC₂H₅)₂ | bluish red |
| 41 | " | 2-OCH₃-5-C₂H₅-phenyl-NH₂ | 2-OC₂H₅-5-NHCOCH₃-phenyl-N(CH₂CH₂OCOOCH₃)₂ | ruby |
| 42 | 4-nC₄H₉O-2-SO₃H-phenyl-NH₂ | 3-CH₃-phenyl-NH₂ | phenyl-N(C₂H₅)(CH₂-phenyl) | yellowish scarlet |
| 43 | " | " | 3-CH₃-phenyl-N(C₂H₅)₂ | red |
| 44 | " | phenyl-NH₂ | 3-CH₃-phenyl-N(C₂H₅)(CH₂-phenyl) | scarlet |
| 45 | 5-CH₃O-2-SO₃H-phenyl-NH₂ | 3-CH₃-phenyl-NH₂ | phenyl-N(C₂H₅)(CH₂-phenyl) | yellowish red |
| 46 | " | phenyl-NH₂ | phenyl-N(C₂H₅)₂ | red |
| 47 | 4-HO-2-SO₃H-phenyl-NH₂ | 3-CH₃-phenyl-NH₂ | 3-CH₃-phenyl-N(C₂H₅)(CH₂-phenyl) | red |
| 48 | " | phenyl-NH₂ | 3-CH₃-phenyl-N(CH₂CH₂CN)(C₂H₅) | yellowish red |
| 49 | 4-phenyl-O-2-SO₃H-phenyl-NH₂ | 3-CH₃-phenyl-NH₂ | 3-CH₃-phenyl-N(C₂H₅)₂ | bluish red |

-continued

| No. | I | II | III | Shade on polyamide |
|---|---|---|---|---|
| 50 | CH₃O—⟨⟩—NH₂ with SO₃H | ⟨⟩—NH₂ with CH₃ | ⟨⟩—N(CH₂CH₂COOCH₃)₂ with NHCOC₃H₇ | bluish red |
| 51 | " | " | ⟨⟩—N(CH₂CH₂CN)₂ with NH—CO—⟨⟩ | bluish red |
| 52 | C₂H₅O—⟨⟩—NH₂ with SO₃H | ⟨⟩—NH₂ with OCH₃, C₂H₅ | ⟨⟩—N(C₂H₅)₂ with OCH₃, NHCOCH₂—⟨⟩ | ruby |
| 53 | " | ⟨⟩—NH₂ with CH₃ | ⟨⟩—N(CH₂CH₂CN)₂ with NHCO nC₄H₉ | bluish red |

EXAMPLE 54

0.1 mol 4-acetylamino-aniline are diazotised in the usual way and the diazo compound is combined in an alkaline medium with a solution of 0.1 mol phenol-3-sulphonic acid. When the coupling is completed, the resultant monoazo dyestuff is isolated and methylated in the usual way with dimethyl sulphate. The methoxy dyestuff is hydrolysed with a 4% aqueous sodium hydroxide solution for about 1 hour. The resultant aminoazo compound is diazotised at room temperature and the product is coupled with an acidic solution of 0.1 mol N-ethyl-N-phenyl-benzylamine. The product is isolated in the usual way and after drying and pulverising, there is obtained a dyestuff which dyes polyamide from a neutral or weakly acidic bath in scarlet shades.

EXAMPLE 55

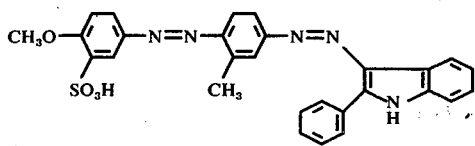

20.3 g (0.1 mol) 4-amino-anisole-sulphonic acid-(2) are dissolved in 200 ml of water with sodium hydroxide at pH 7, 6.9 g sodium nitrite are added, the mixture is cooled with ice and 28 ml of concentrated hydrochloric acid are added at 0°– 5° C. The diazotisation is completed after 30 minutes. A solution of 10.7 g (0.1 mol) 3-amino-toluene in 100 ml of water and 5 ml of concentrated hydrochloric acid is then added to the diazo suspension. The mixture is then slowly buffered at 0° – 10° C with a concentrated sodium hydroxide solution until the pH is 6. The dyestuff is salted out with 10% sodium chloride and filtered off with suction.

The aminoazo dyestuff so obtained is dissolved in 300 ml of water at pH 7, 6.9 g sodium nitrite are then added, the mixture is cooled, and 28 ml of concentrated hydrochloric acid are added at 0° – 5° C. After diazotising for one hour, the disazo suspension is poured into a solution of 19.3 g (0.1 mol) 2-phenyl-indole in glacial acetic acid and somewhat buffered with sodium acetate or solution of sodium hydroxide. After coupling, the dyestuff is isolated in the usual way and dried at 90° C. The dyestuff dyes polyamide from a weakly acidic or neutral bath in reddish-orange shades of good fastness to light.

When the procedure described above is followed, but with the use of the compounds mentioned in Column I as diazo components, those of Column II as middle components and those of Column III as final components, then valuable disazo water-soluble dyestuffs are again obtained, which dye polyamide in orange to bluish red shades of good fastness to light and good neutral affinity.

| No. | I | II | III |
|---|---|---|---|
| 56 | CH₃O—⟨⟩—NH₂ with SO₃H | ⟨⟩—NH₂ with CH₃ | H₃C—⟨indole⟩ |

| No. | I | II | III |
|---|---|---|---|
| 57 | " | " | 2-phenyl-1-methyl-indole |
| 58 | " | " | 2-methyl-1-(C₂H₄CN)-indole |
| 59 | " | aniline | 2-phenyl-indole (NH) |
| 60 | " | " | 2-methyl-indole (NH) |
| 61 | " | " | 2-phenyl-1-(C₂H₄CN)-indole |
| 62 | " | " | 2-phenyl-1-(C₂H₄CONH₂)-indole |
| 63 | " | 2-methylaniline | 2-phenyl-indole (NH) |
| 64 | " | 2-methoxy-5-methyl-aniline | 2-methyl-indole (NH) |
| 65 | " | " | 2-phenyl-indole (NH) |
| 66 | 2-ethoxy-5-amino-benzenesulfonic acid | aniline | 2-methyl-indole (NH) |

| No. | I | II | III |
|---|---|---|---|
| 67 | " | " | 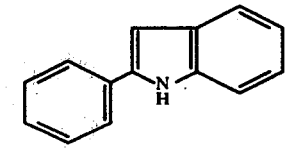 |
| 68 | " | " | 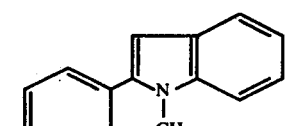 |
| 69 | " | 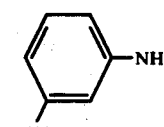 | 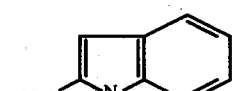 |
| 70 | " | " | 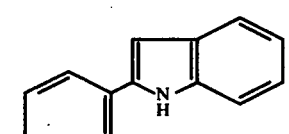 |
| 71 | " | " | 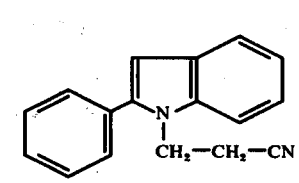 |
| 72 | " | 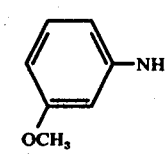 | 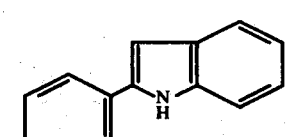 |
| 73 | " | " | 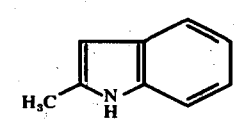 |
| 74 | " | 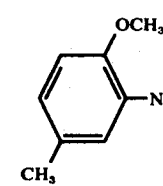 | 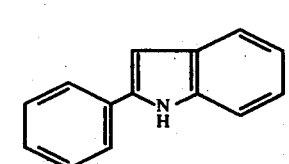 |
| 75 | " | " | 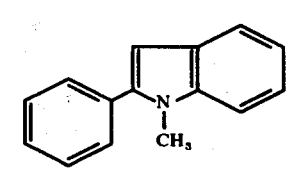 |
| 76 | " | " | 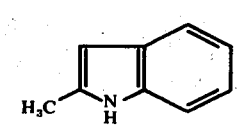 |

| No. | I | II | III |
|---|---|---|---|
| 77 | " | 2-methoxyaniline | 2-phenyl-1H-indole |
| 78 | " | " | 1-(2-cyanoethyl)-2-phenyl-1H-indole |
| 79 | 5-amino-2-phenoxybenzenesulfonic acid | aniline | 2-phenyl-1H-indole |
| 80 | " | " | 2-methyl-1H-indole |
| 81 | " | " | 1-methyl-2-phenyl-1H-indole |
| 82 | " | " | 1-(2-cyanoethyl)-2-phenyl-1H-indole |
| 83 | " | 3-methylaniline | 2-methyl-1H-indole |
| 84 | " | " | 2-phenyl-1H-indole |
| 85 | " | " | 1-methyl-2-phenyl-1H-indole |
| 86 | " | " | 1-(2-cyanoethyl)-2-methyl-1H-indole |

| No. | I | II | III |
|---|---|---|---|
| 87 | '' | 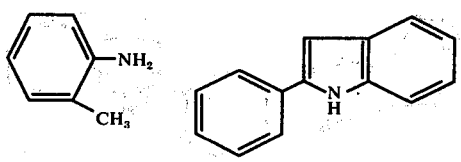 | |
| 88 | '' | 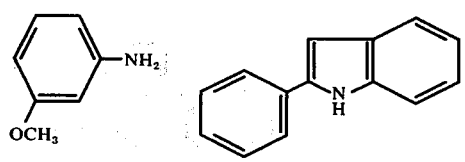 | |
| 89 | '' | '' | 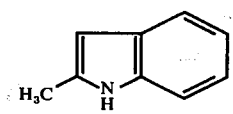 |
| 90 | '' | '' | 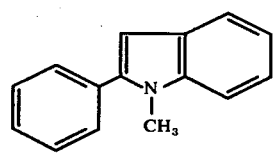 |
| 91 | '' | 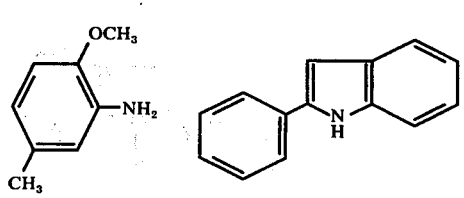 | |
| 92 | '' | '' | 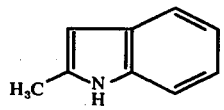 |
| 93 | '' | 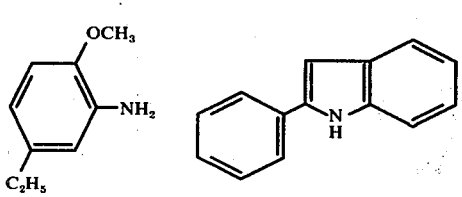 | |
| 94 | '' | '' | 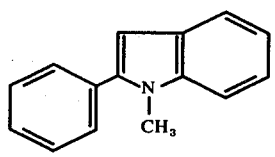 |
| 95 | '' | '' | 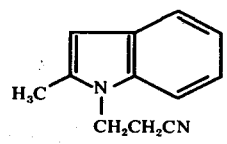 |
| 96 | 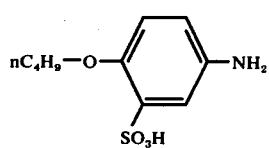 | | |

-continued

| No. | I | II | III |
|---|---|---|---|
| 97 | 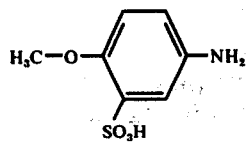 | 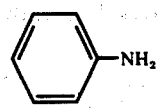 |  |
| 98 | " | " | 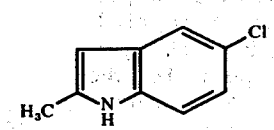 |
| 99 | " | " | 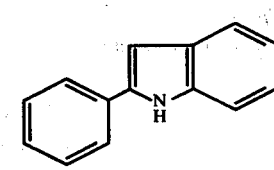 |
| 100 | " | " | 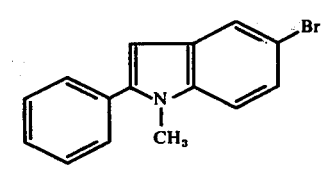 |
| 101 | " | 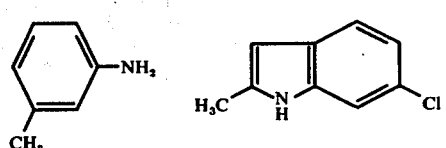 | |
| 102 | " | " | 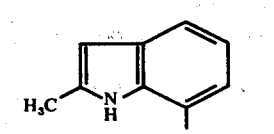 |
| 103 | " | " | 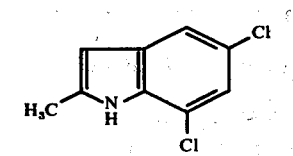 |
| 104 | " | " | 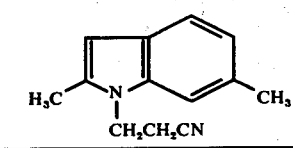 |

EXAMPLE 105

0.1 mol 4-acetylamino-aniline are diazotised in the usual way and the product is combined in an alkaline medium with a solution of 0.1 mol phenol-3-sulphonic acid. When the coupling is completed, the resultant monoazo dyestuff is isolated and methylated in the usual way with dimethyl sulphate. The methoxy dyestuff is hydrolysed with a 4% aqueous sodium hydroxide solution for about one hour. The resultant aminoazo compound is diazotised at room temperature and the product is combined with a solution of 0.1 mol 2-phenylindole in glacial acetic acid. The product is isolated in the usual way and after drying and grinding, there is obtained a dyestuff which dyes polyamide from a neutral or weakly acidic bath in reddish orange shades.

We claim:
1. Disazo dyestuff which in the form of the free acid corresponds to the formula

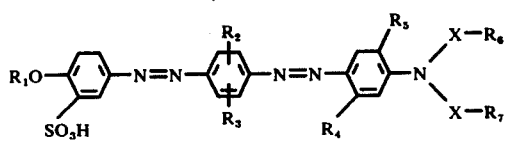

in which
   $R_1$ stands for hydrogen, alkyl of 1-4 carbon atoms, or phenyl;

$R_2$, $R_3$ and $R_4$, independently of one another, stand for hydrogen, chloro, bromo, alkyl of 1–4 carbon atoms, alkoxy of 1–4 carbon atoms, alkylcarbonylamino of 1–4 carbon atoms, methylsulfonylamino, phenylcarbonylamino, chlorophenyl carbonylamino, or phenylsulfonylamino;

$R_5$ stands for hydrogen, alkyl of 1–4 carbon atoms or alkoxy of 1–4 carbon atoms;

$R_6$ and $R_7$ independently of one another, stand for hydrogen, hydroxy, cyano, chloro, bromo, alkyl-carbonyloxy of 1–4 carbon atoms in the alkyl portion, alkoxycarbonyloxy of 1–4 carbon atoms in the alkoxy portion alkoxy carbonyl of 1–4 carbon atoms in the alkoxy portion, or phenyl; and X stands for alkylene of 1–4 carbon atoms.

2. Disazo dyestuff which in the form of the free acid corresponds to the formula

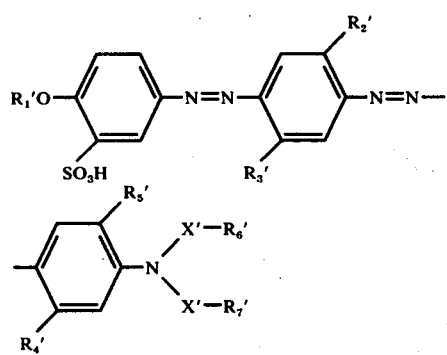

in which
$R_1'$ stands for alkyl with 1 – 4 carbon atoms;
$R_2'$ stands for hydrogen or alkoxy with 1 – 4 carbon atoms;
$R_3'$ stands for hydrogen or alkyl with 1 – 4 carbon atoms;
$R_4'$ stands for hydrogen, alkyl with 1 – 4 carbon atoms, Cl, Br or an alkyl-carbonylamino group with 1 – 4 carbon atoms;
$R_5'$ stands for hydrogen or alkoxy with 1 – 4 carbon atoms;
X stands for —$CH_2$—$CH_2$— or —$CH_2$—, and
$R_6'$ and $R_7'$, independently of one another, stand for hydrogen Cl, OH, CN, alkyl-carbonyloxy with 1 – 4 carbon atoms in the alkyl group, alkoxycarbonyloxy with 1 – 4 carbon atoms in the alkoxy group or alkoxy-carbonyl with 1 – 4 carbon atoms in the alkoxy group.

3. The dyestuff which in the form of the free acid corresponds to the formula

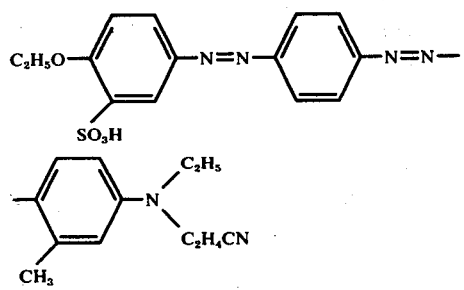

4. The dyestuff which in the form of the free acid corresponds to the formula

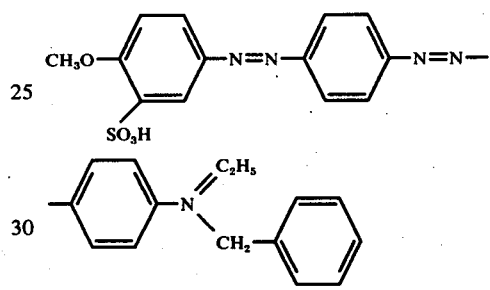

5. The dyestuff which in the form of the free acid corresponds to the formula

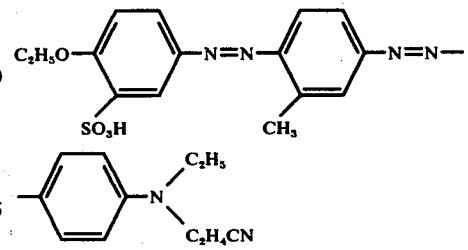

* * * * *